March 26, 1968 D. E. CHUBB ETAL 3,375,014
SEAL ASSEMBLY
Filed Feb. 9, 1966 2 Sheets-Sheet 1

ANGELO C. GIURLANDO
RAYMOND E. RAYNER
DONALD E. CHUBB
*INVENTORS*

BY *Daniel H. Bobis*
*Atty*

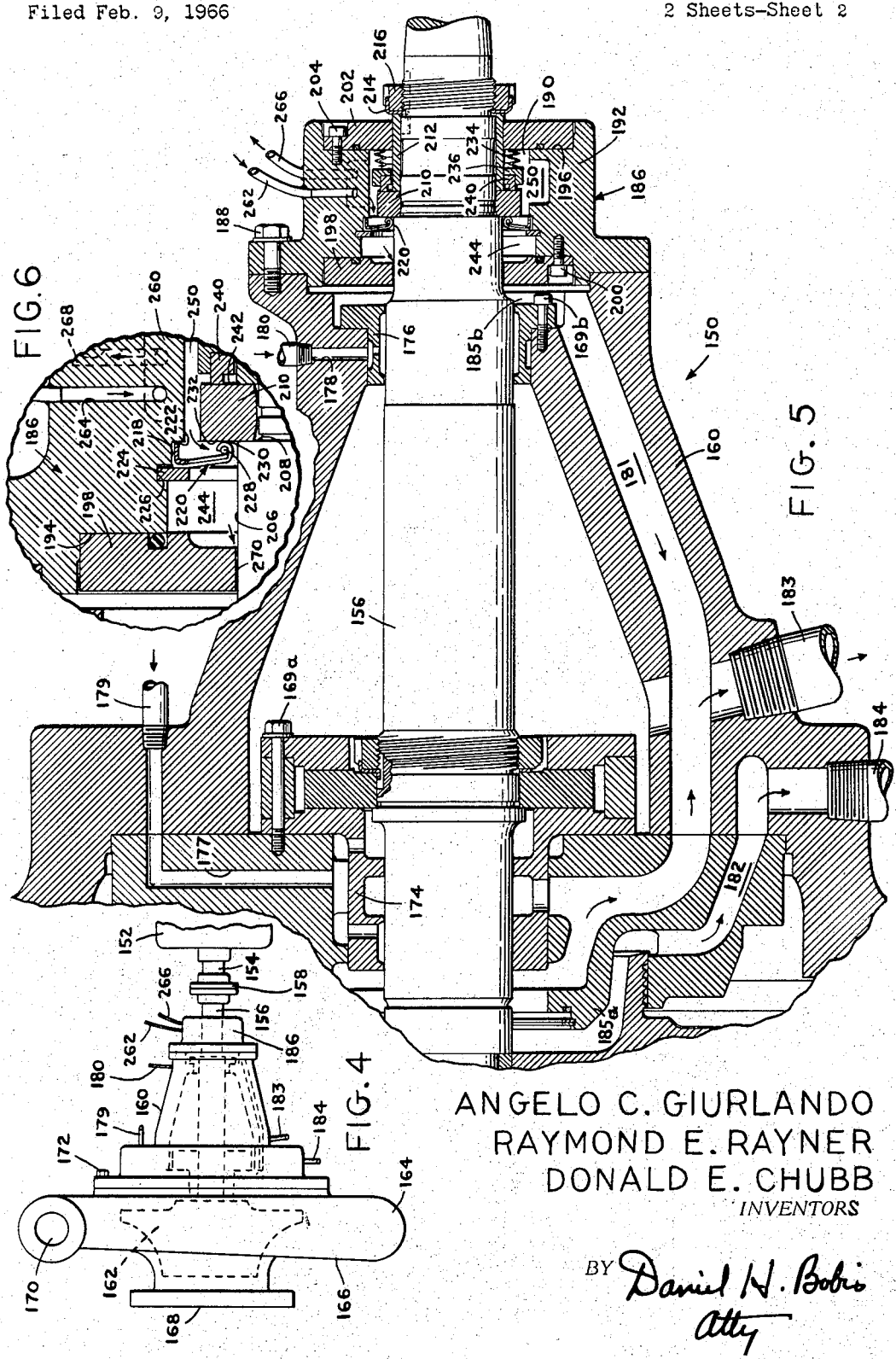

United States Patent Office 3,375,014
Patented Mar. 26, 1968

3,375,014
SEAL ASSEMBLY
Donald E. Chubb, Caldwell, N.J., Angelo C. Giurlando, Muskego, Wis., and Raymond E. Rayner, Colonia, N.J., assignors to Worthington Corporation, Harrison, N.J., a corporation of Delaware
Filed Feb. 9, 1966, Ser. No. 526,119
10 Claims. (Cl. 277—3)

This invention relates to a seal assembly for a shaft. More particularly, the invention relates to a seal assembly for a jackshaft of a drive mechanism.

Heretofore, the prior art seal devices have required complex structure and operation, have not maintained the desired cooling of the seal means thereby limiting the life of the same, and have not been able to insure lubricated startups after long periods of non-use.

Accordingly, it is an object of the present invention to provide a novel seal assembly for a shaft which overcomes the prior art difficulties; which is simple, reliable and economical, in both structure and operation; which is compact and has easy access for service or is easy to remove; which provides a cavity flooded with oil so that on startup the seals will be cooled and lubricated; which provides a baffle or dam in the cavity to insure maximum circulation and cooling by the oil so as to extend the seal life; which during operation provides for continuous oil lubrication of at least one of the bearings upon which the shaft is mounted; which provides an oil feed on either side of the lip seal but during operation the pressure of the oil outside the cavity is maintained higher to insure the flow of oil across the seal into the cavity, while on shutdown oil will be trapped in the feed line, drain line and the cavity so that the pressure inside the cavity will be greater causing the lip seal to close preventing the oil from leaking from the cavity; which provides for longer lip seal life due to cooling and minimum contact of the seal to shaft during operation; which permits the outer or running seal to be removed without removing the inner or lip seal so as to effectively prevent air leakage along the shaft; which has the shaft mounted in the housing on suitable bearings in order to obtain minimum eccentricity and wobble in operation.

This invention relates to a novel seal assembly having a housing in which a shaft is mounted on suitable bearings to provide for concentric operation of an open type drive arrangement. A cavity and chamber means are formed in the housing to which feed lines connect to supply oil for cooling and lubricating at least one of the bearings and the seal means during normal operation. On shutdown the oil remains trapped in the cavity to provide a viscous liquid which is more positive than an ordinary gas seal, to prevent dry startups, and to prevent air or other foreign matter from entering across the open end of the shaft. Dam or baffle means are disposed in the cavity to insure maximum oil circulation and seal cooling. It is by these and other means that the above objects are realized.

Other objects and advantages will be apparent from the following description of one embodiment of the invention and the novel features will be particularly pointed out hereinafter in the claims; reference being had to the accompanying drawings forming a part of this specification wherein like reference characters designate corresponding parts in the several views. Furthermore the phraseology or terminology employed herein is for purpose of description and not of limitation.

In the drawings:

FIGURE 4 is a diagrammatic illustration of another drive mechanism embodying the novel seal assembly.

FIGURE 5 is an enlarged sectional view of the novel seal assembly shown in FIGURE 4.

FIGURE 6 is an exploded fragmentary view of a portion of FIGURE 5.

Figure 2:
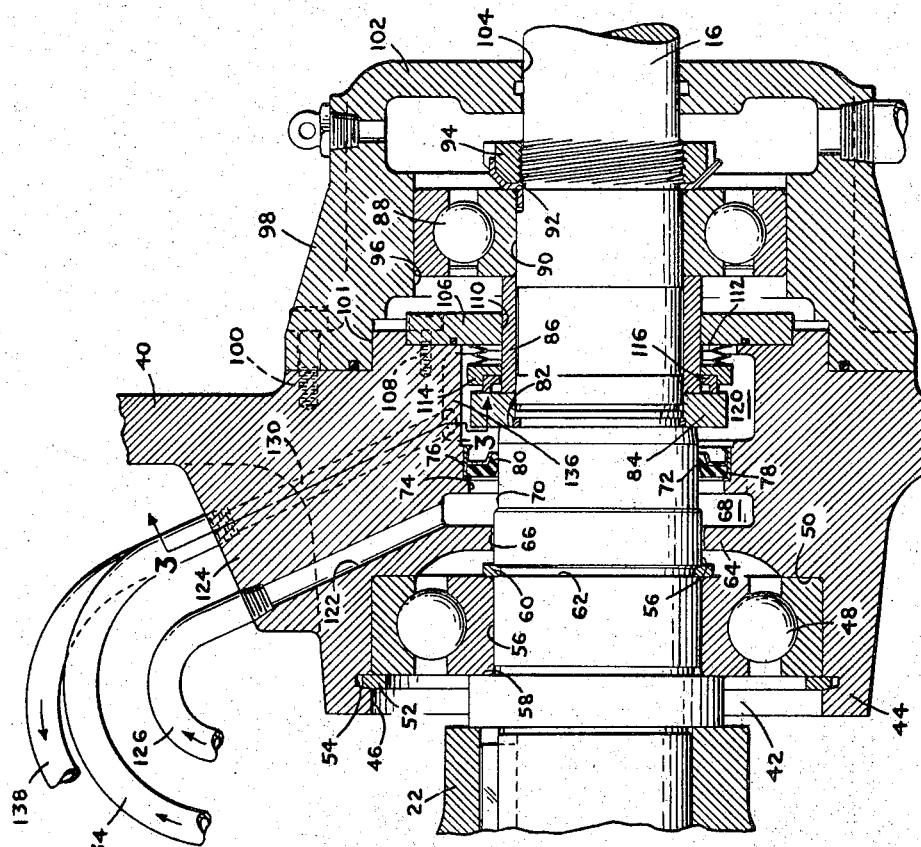
FIGURE 2 is an enlarged sectional view of the novel seal assembly.
Figure 3:
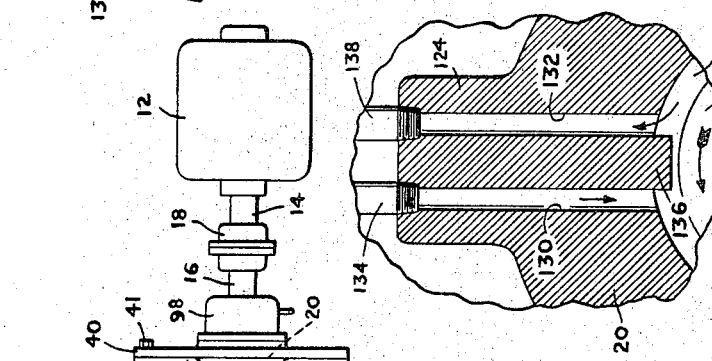
FIGURE 3 is a view taken along line 3—3 of FIGURE 2.
Figure 1:
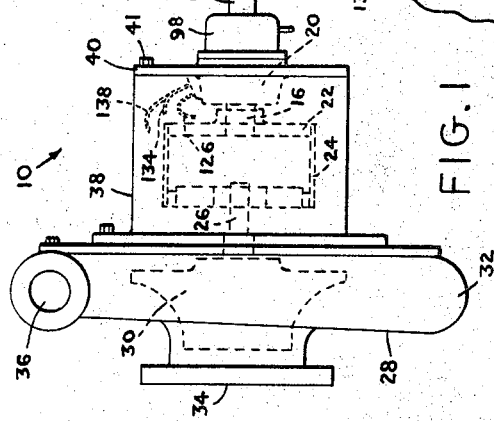
FIGURE 1 is a diagrammatic illustration of one drive mechanism in which the novel seal assembly is embodied.

In the embodiment of the invention, illustrated in FIGURES 1, 2 and 3, the drive mechanism designated generally as 10 may be of any conventional design such as is shown in FIGURE 1 of a prime mover 12 having a drive shaft 14 connected to jackshaft 16 at coupling 18. The jackshaft 16 is suitably mounted in and extends through housing 20, as more fully described hereinafter, to connect to hub 22 which in turn engages the speed increasing gearing 24 to transmit the rotatable power to shaft 26. Shaft 26 extends into a suitable machine, such as compressor 28 and has impeller 30 mounted on the end thereof remote from gearing 24. Impeller 30 is mounted within casing 32 and is disposed intermediate the axial suction inlet 34 and the outlet 36, thus allowing compressor 28 to operate in a manner well known in the art. Gearing 24 is disposed in gear housing 38 which on the end adjacent impeller 30 is connected to casing 32, and on the end remote therefrom has a closing plate 40 suitably connected thereto as by threaded member 41. Prime mover 12 may be any suitable source of power such as an electric motor, an engine, a turbine, or the like.

Jackshaft housing 20, as shown in FIGURE 2, is formed integrally with closing plate 40. Housing 20 has an axial opening 42 extending therethrough, which opening has sections of varying diameters. At the innermost end 44 of housing 20 is counterbore 46 into which inner ball bearing 48 is inserted to abut shoulder 50. A snap ring 52 is disposed in groove 54 of the counter bore to prevent inner ball bearing 48 from changing its position in housing 20 during operation. Bearing 48 is mounted in position on section 56 of shaft 16 between the abutting shoulder 58 and snap ring 60. Snap ring 60 is disposed in groove 62 formed in section 56.

Outwardly of the connection of bearing 48 an annular radially inwardly extending partition 64 is formed of slightly larger diameter than the diameter of section 56. A restricted opening or orifice 66 exists between the internal diameter of partition 64 and a periphery of section 56.

A chamber 68 is formed in housing 20 outwardly of partition 64 and in communication with opening 66. Chamber 68 borders sections 56 and 70 of shaft 16, with section 70 being of slightly smaller diameter. The outer limits of chamber 68 are established by a lip seal 72 suitably connected to section 74 of housing 20 as at 76. Lip seal 72 is made of suitable material and may be of any conventional design such as having a vertical section 78 extending radially inwardly and from which a frustoconical section 80 extends in the direction away from chamber 68 to engage section 70 of shaft 16 along its inner periphery.

The end of sections 70 of shaft 16 is tapered and forms a shoulder 82 against which runner 84 is disposed. The outer side of runner 84 abuts spacer 86 which serves to position outer ball bearing 88 along section 90 of shaft 16. A locking member 92 is drawn into position against the other side of ball bearing 88 by the threaded connection of nut 94 to complete the mounting of runner 84 and ball bearing 88.

An outer cover 98 having a counter bore 96 therein limits the entrance of dirt and foreign matter, and has its inner end fixedly connected to housing 20 as by threaded members 100 or other suitable means. The outer end 102 of cover 98 extends radially inwardly and terminates in an annular opening 104 of slightly larger diameter than the corresponding shaft 16 section to serve as a natural barrier to dirt and other foreign matter. The upper end of ball bearing 88 is press fitted in counter bore 96 on outer cover 98 being connected to housing 20. Housing 20 has a rabbet fit as at 101 which will radially position bearing 88 to maintain shaft 16 in true alignment.

An annular plate 106 is fixedly connected to the outer end of housing 20 as by threaded member 108, inwardly of outer cover 98 and between runner 84 and outer ball bearing 88. Plate 106 has an inner opening 110 of slightly larger diameter than the outer diameter of spacer 86 so as to permit rotatable movements therebetween. A resilient bellows 112 has one of its ends connected to plate 106 and the other end connected to a positioner member 114 into which is disposed an end face seal 116. The face of end face seal 116 opposite the outer face of runner 84 is urged to engage said face by bellows 112 whereby the respective faces will function as an oil seal in the manner well known in the art.

A cavity means 120 is formed in the area bounded by lip seal 72 and plate 106, with lip seal 72 and end face seal 116 the only places in cavity 120 through which oil may enter or leave cavity means 120 along shaft 16.

A passage 122 is formed in housing 20 and extends through boss 124 thereof to communicate with the upper end of chamber 68. A feed line 126 is suitably connected such as by threading into boss 124 in alignment with passage 122. Oil is supplied to line 126 from a suitable source (not shown) such as oil reservoir and may be drawn therefrom by pumping means (not shown) and returned thereto by suitable means (not shown) by reason the existing pressure differential and gravity. The oil in line 126 will pass into passage 122 from which it enters chamber 68. During operation of prime mover 12 and compressor 28 the oil will be supplied to line 126 at a predetermined pressure. The restrictive opening or orifice 66 is of a predetermined area, adequate to allow for proper lubrication of inner ball bearing 48 without the flow being excessive or causing high heat generation and power consumption due to oil churning. However, orifice 66 acts to increase the pressure of the oil in chamber 68 above that which exists in chamber 120 for purposes more fully explained hereinafter. The oil from chamber 68 will cause lip seal 72 to be raised and held out of contact with shaft 16 during operation of mechanism 10 and the circulation of oil therein. In this way the wear of lip seal 72 will be held to a minimum since the flow from chamber 68 will cause the lip to be held off shaft 16. On shutdown of mechanism 10 the supply of oil in line 126 will cease and whatever oil there is in chamber 68 and passage 122 will drain through opening 66 past ball bearing 48 to gear housing 38, from which it is suitably drained to the oil reservoir.

Oil sent to and returned from cavity means 120 may be from the same source (not shown) as that feeding chamber 68. In any event the oil in cavity means 120 will not be at a higher pressure than the pressure existing in chamber 68. FIGURES 2 and 3 show feed passage 130 and drain passage 132 respectively extending from boss 124 through housing 20 into cavity means 120. A feed line 134 connects into boss 124 in alignment with passage 130 to deliver oil therethrough into cavity means 120. Passages 130 and 132 may be formed adjacent each other with a dam means or baffle 136 disposed therebetween to prevent incoming oil from passage 130 being directly removed from cavity means 120 through passage 132. Assuming the direction of rotation of shaft 16 and runner 84 as indicated in FIGURE 3 by the arrow to be counterclockwise, oil entering into cavity means 120 from passage 130 is required to pass around the shaft in the same direction as rotation thereof prior to being discharged into passage 132. Drain line 138 connects into passage 132 for returning the oil to the system. Thus it is apparent that baffle or dam 136 will act to assure complete circulation of the oil being fed into cavity means 120 and will limit or substantially eliminate re-circulation of oil which has already passed about shaft 16. This arrangement results in a flooded cavity means 120 with oil covering lip seal 72 and end face seal 116 at all times during operation of mechanism 10 and insures the most efficient cooling. Note that the pressure of the oil in cavity means 120 will at all times during operation of mechanism 10 to be less than that existing in chamber 68 because orifice 66 has maintained the pressure therein whereas oil flows freely out of cavity 120 via drain passage 132 which is in communication with the lower pressure oil reservoir. This means that the oil flowing along shaft 16 past lip seal 72 is always in the direction of cavity means 120.

The cooling and flooding of seals 72 and 116 results in maximum seal life, with the additional advantage that the flooding results in added seal effectiveness since the sealing is against a viscous liquid instead of gas.

The pressure differential existing during operation of mechanism 10 between chamber 68 and cavity means 120 can be obtained in any other convenient manner such as the suitable orificing of the feed and drain lines.

On shutdown of mechanism 10 resilient bellows 112 will urge end face seal 116 to engage runner 84 thus closing this exit. Feed line 134 and drain line 138 connect into cavity means 120 from above so that on shutdown of mechanism 10 oil will be trapped in these lines in addition to the quantity of oil remaining in cavity means 120. The oil in chamber 68 will drain into gear housing 38 and offer essentially no pressure resistance. Thus the effect of the height of oil in lines 134 and 138 will establish a pressure differential which tends to close lip seal 72 to insure the continued flooded condition of cavity means 120. In addition finger springs (not shown) may be provided in the lip seal to provide a positive force urging closure of the lip seal. Thus, even during shutdown dirt and other foreign matter is prevented from entering housing 20.

Shaft 16 may be floatingly mounted in housing 20 by ball bearings 48 and 88 respectively to provide for minimum wobble and eccentricity during operation. The ball bearings allow for a more concentric operation not usually attainable with conventional sleeve type bearings.

The outer most seal, shown as the end face seal 116 and the associated parts disposed outwardly of lip seal 72, and connected to shaft 16 and housing 20 may be removed for maintenance, inspection or replacement. This can be done without removing lip seal 72 which will still function to seal against air in leakage.

In the embodiment of the invention illustrated in FIGURES 4 and 5 an open type direct drive mechanism designated generally as 150 is shown. Mechanism 150 as shown in FIGURE 4 may be of any conventional design such as a prime mover 152 having a drive shaft 154 connected to shaft 156 at coupling 158. Shaft 156 is suitably mounted in and extends through housing 160, as more fully explained hereinafter, to connect directly to impeller 162. Impeller 162 is disposed in a suitable machine such as compressor 164 having a casing 166 with the usual inlet 168 and outlet 170 therein. Housing 160 is connected to casing 166 by suitable means such as threaded member 172.

Housing 160 is a bell shaped member in which sleeve bearings 174 and 176 are connected thereto at either end thereof by suitable means such as threaded members 169a and 169b respectively. Oil is fed to bearings 174 and 176 from passages 177 and 178, respectively, into which is connected feed lines 179 and 180 from the oil supply system (not shown). The oil from bearings 174 and 176 will drain into passages 181 and 182 into which is connected drain lines 183 and 184 respectively from which the oil is returned to the oil supply system (not shown) for recirculation. Passage 181 communicates with space 185a adjacent bearing 174 at one end thereof and with space 185b formed outwardly of bearing 176 at the other end thereof.

A cover member 186 is connected to housing 160 at the outer end thereof by bolts 188 or other suitable means. Cover member has an axial opening 190 radially inwardly of axially extending section 192 which has an inner recess 194 and an outer recess 196 formed therein. An inner annular plate 198 is connected within recess 194 as by bolts 200, while an outer annular plate 202 is connected within recess 196 as by bolts 204.

The diameter of shaft 156 necks down outwardly of its engagement with sleeve bearing 176 to form a section 206, at the end of which is formed a shoulder 208. A runner 210 abuts shoulder 208 and is kept in position by spacer 212, locking member 214 and nut 216, all disposed outwardly of runner 210 with nut 216 threadedly connected to shaft 156.

Opening 190 has a counter bore 218 therein, into which is disposed a lip seal 220 the upper end of which abuts shoulder 222 of counter bore 218 and is held there against by a snap ring 224 disposed in groove 226. The lower end of lip seal 20 is somewhat arcuate and has a light spring 228 disposed therein to urge the seal face 230 thereof in the direction of the inner face 232 of runner 210.

A resilient bellows 234 has one of its ends connected to plate 202 and the other end connected to positioner member 236 into which is disposed an end face seal 240. The face of seal 240 is urged by bellows 234 to engage the outer face 242 of runner 210.

A chamber 244 is formed outwardly of plate 198 and is bounded by section 206 of shaft 156 and lip seal 220.

A cavity means 250 is formed in the area bounded by lip seal 220 and plate 202, with the lip seal 220 and end face seal 240 the only places in cavity means 250 through which oil may enter or leave along runner 210 or shaft 156.

Baffle or dam 260 is formed integrally with section 192 and extends radially inwardly therefrom lying in an axial direction. A feed line 262 connects into passage 264 which communicates with cavity means 250 on the near side of baffle 260 and delivers oil thereto. The baffle prevents the oil from being immediately discharged and therefore permits it to flow about shaft 156 in the same direction as rotation. A drain line 266 connects into passage 268 into which the largest portion of the oil will be delivered for return to the oil reservoir (not shown). On the discharge side the baffle 260 prevents spent oil from being recirculated.

During operation the largest portion of the oil entering cavity means 250 from feed line 262 will be discharged in drain line 266. However, a substantial portion of oil will flow past lip seal 220. During non-operation lip seal 220 will have its seal face 230 in contact with the inner face 232 of runner 210. This contact is maintained by the urging of spring 228. The force exerted by spring 228 is much less than the force of the oil, which is under a higher pressure of the positive feed oil system during operation of mechanism 150. The result of supplying pressure oil into cavity means 250 is that lip seal 220 will be raised out of contact from face 232 of runner 210 by the flow of oil from cavity means 250 into chamber 244. Accordingly, lip seal 220 wear will be minimal. On shutdown of mechanism 150 the oil in chamber 244 will drain therefrom as described more fully hereinafter, and lip seal 220 will again contact face 232 of runner 210 to prevent oil trapped in cavity means 250 from leaking there across.

The inner axial boundary of chamber 244 is established by plate 198. The inner diameter of plate 198 is slightly larger than the corresponding shaft section 206 thus forming a restrictive opening or orifice 270 of predetermined area whereby oil from chamber 244 will be metered into space 185b where it will combine with a portion of the oil discharged from sleeve bearing 176 prior to delivery to passage 181 for return to the oil system.

In addition orifice 270 serves to prevent immediate discharge of the oil in chamber 244 thereby minimizing the drop pressure which occurs between cavity means 250 and chamber 244. In this way excessive oil is prevented from leaking across lip seal 220 and causing permanent distortions in said lip seal. The quantity of oil and the pressure drop existing from cavity means 250 to chamber 244 is controlled by the size of orifice 270. It is noted that while the flow of oil across lip seal 220 is in the reverse direction as that described hereinbefore for lip seal 72 the principles of operation and ultimate results will be the same.

In the present embodiment, during operation the pressure in cavity means 250 will be higher than that existing in chamber 244. During shutdown the oil in chamber 244 will bleed past orifice 270 thus emptying the chamber. On the other hand on shutdown face seal 240 and lip seal 220 will each close against the opposite faces of runner 210 to trap oil in cavity means 250 and the associated passages and lines connected thereto. The force exerted by resilient bellows 234 and spring 228 of lip seal 220 is substantially greater than any force created by the static pressure of the trapped oil in cavity means 250 so that seals 220 and 240 will remain in sealed relationship against runner 210. This will permit cavity means 250 to remain in a flooded condition and prevent any of the trapped oil from leaking across shaft 156.

It will be understood that various changes in the details, materials, arrangement of parts and operating conditions which have been herein described and illustrated in order to explain the nature of the invention may be made by those skilled in the art within the principle and scope of the invention as expressed in the claims.

What is claimed is:

1. A mechanical seal for a rotatable shaft extending into a housing comprising:
   (a) a fluid tight main sealing member between the shaft and the housing;
   (b) a second sealing member between the shaft and the housing inboard of the main sealing member, the second sealing member being movable in response to a predetermined pressure differential across the seal to a non-contacting configuration in which fluid may flow past the sealing member;
   (c) an annular chamber formed in the housing between the sealing members;
   (d) an inlet port and an outlet port in the chamber for circulating lubricating oil through the chamber when the shaft is rotating, the inlet port being circumferentially spaced a relatively short distance from the outlet port in the direction of rotation of the shaft;
   (e) an inwardly projecting wall in the chamber between the inlet and the outlet ports to prevent oil from flowing directly from the inlet to the outlet ports;
   (f) means for maintaining a sufficient pressure differential across the second sealing member when the shaft is rotating to hold the seal in its non-contacting configuration.

2. A mechanical seal for a rotatable shaft extending into a housing as defined in claim 1 including a pair of axially spaced ball bearings mounted between the shaft and the housing, one ball bearing being inboard of the second sealing member and the other being outboard of the main sealing member.

3. A mechanical seal as defined in claim 1 wherein the second sealing member is urged into its contacting position by a spring to prevent flow along the shaft when the shaft is not rotating.

4. A mechanical seal as defined in claim 3 wherein the rotatable shaft is horizontally mounted and the inlet and outlet ports in the chamber are at the top of the chamber so that oil will be retained in the chamber when the shaft is not rotating, thereby keeping the sealing members lubricated during shutdown and providing immediate lubrication when the shaft begins to rotate.

5. A mechanical seal for a rotatable shaft extending into a housing comprising:
(a) two axially spaced sealing members mounted between the housing and the shaft;
(b) an annular chamber formed in the housing between the sealing members;
(c) an inlet port and an outlet port in the chamber for circulating lubricating oil through the chamber when the shaft is rotating, the inlet port being circumferentially spaced a relatively short distance from the outlet port in the direction of rotation of the shaft; and
(d) a longitudinally extending inwardly projecting baffle in the chamber between the inlet and the outlet ports to prevent oil flow directly from the inlet to the outlet port.

6. A mechanical seal as defined in claim 5 wherein the rotatable shaft is horizontally mounted and the inlet and outlet ports in the chamber are at the top of the chamber so that oil will be retained in the chamber when the shaft is not rotating, thereby keeping the sealing members lubricated during shutdown and providing immediate lubrication when the shaft begins to rotate.

7. A mechanical seal as defined in claim 5 including a ball bearing mounted between the housing and the shaft on either side of the seal assembly.

8. A mechanical seal between a housing and a rotatable shaft extending into the housing comprising:
(a) a fluid tight main sealing member between the shaft and the housing;
(b) a second sealing member between the shaft and the housing inboard of the main sealing member, the second sealing member being movable in response to a predetermined pressure differential across the seal to a non-contacting configuration in which fluid may flow past the sealing member;
(c) an annular chamber formed in the housing between the sealing members;
(d) means for supplying lubricating oil to the annular chamber while the shaft is rotating; and
(e) means for maintaining a sufficient pressure differential across the second sealing member when the shaft is rotating to hold the seal in its non-contacting configuration;

whereby oil flow across the second sealing member will reduce wear on the seal while the shaft is rotating and oil will be retained in the annular chamber when the shaft stops rotating so as to provide lubrication for the main seal when the shaft is stationary.

9. A mechanical seal between the housing and a rotatable shaft extending into the housing as defined in claim 8 including a pair of axially spaced ball bearings mounted between the shaft and the housing, one ball bearing being inboard of the second sealing member and the other being outboard of the main sealing member.

10. A mechanical seal between a housing and a rotatable shaft extending into the housing as defined in claim 8 wherein the second sealing member is urged into its contacting position by a spring to prevent flow along the shaft when the shaft is not rotating.

References Cited

UNITED STATES PATENTS

| | | | |
|---|---|---|---|
| 2,710,205 | 6/1955 | Brkich | 308—36.3 X |
| 3,030,118 | 4/1962 | Groce | 277—59 X |
| 3,031,197 | 4/1962 | Wilkinson | 277—74 X |
| 2,162,486 | 6/1939 | LeTourneau. | |
| 2,381,823 | 8/1945 | La Bour. | |
| 2,485,497 | 10/1949 | Lemley et al. | |
| 2,488,200 | 11/1949 | Juhlin et al. | |
| 2,622,902 | 12/1952 | Malmvik. | |
| 2,830,755 | 4/1958 | Anderson. | |
| 3,028,181 | 4/1962 | Thompson et al. | |
| 3,129,011 | 4/1964 | Campbell. | |

FREDERICK L. MATTESON, Jr., *Primary Examiner.*

ROBERT A. DUA, *Examiner.*